(12) United States Patent
Ordonez (10) Patent No.: US 10,563,852 B2
(45) Date of Patent: Feb. 18, 2020

(54) PHOTOCELL COVER AND METHOD OF USE

(71) Applicant: Ricardo Ordonez, Hollywood, FL (US)

(72) Inventor: Ricardo Ordonez, Hollywood, FL (US)

( * ) Notice: Subject to any disclaimer, the term of this patent is extended or adjusted under 35 U.S.C. 154(b) by 246 days.

(21) Appl. No.: 15/389,890

(22) Filed: Dec. 23, 2016

(65) Prior Publication Data
US 2018/0180467 A1      Jun. 28, 2018

(51) Int. Cl.
*F21V 23/04*      (2006.01)

(52) U.S. Cl.
CPC ............................... *F21V 23/0464* (2013.01)

(58) Field of Classification Search
CPC ...... G01J 1/0228; G01J 1/0271; G01J 1/0403; F21V 23/0464
See application file for complete search history.

(56) References Cited

U.S. PATENT DOCUMENTS

| | | | |
|---|---|---|---|
| 1,771,915 A | 7/1930 | Campbell | |
| 2,632,358 A | 3/1953 | Raphael | |
| 5,747,798 A * | 5/1998 | Smith | ................ H01L 31/167 250/214 AL |
| 2018/0092186 A1 * | 3/2018 | Stuby, Jr. | ........... H05B 37/0227 |

* cited by examiner

*Primary Examiner* — Georgia Y Epps
*Assistant Examiner* — Don J Williams
(74) *Attorney, Agent, or Firm* — Mark C. Johnson; Johnson | Dalal (57) ABSTRACT

A photocell cover, including a jacket that defines a jacket cavity and a jacket opening, that is operable to be used by the user at any time of day and in any level of ambient light. The invention achieves this object by providing a photocell cover to cover a photocell and its housing, blocking any ambient light from reaching the photocell, in order to provide an environment in which the photocell can be tested. The jacket cavity and jacket opening receive a housing of a photocell and simulate a low level of ambient light in the area surrounding the photocell in order to test the functionality of the photocell. The method of using the photocell cover allows the user to test the photocell during any time of day or night, including from a ground level position.

14 Claims, 10 Drawing Sheets

PHOTOCELL COVER AND METHOD OF USE

FIELD OF THE INVENTION

The present invention relates generally to equipment designed to test photocells, and, more particularly, relates to a housing that covers a light that utilizes photocells, providing for the testing of photocells in the daylight, as well as at night.

BACKGROUND OF THE INVENTION

Photocell circuits provide a number of benefits that makes them desirable to use in a number of circumstances, particularly when a light source housing a photocell is in an environment exposed to sunlight or another light source. Photocells often function to measure the amount of ambient light in the area immediately surrounding the photocell in order to determine whether there is a need for a light source to be on or off. In a typical light source that employs a photocell, the photocell will detect a level of ambient light, and will activate the light source upon the darkening of ambient light below a predetermined level. When a certain amount of ambient light exceeds and/or meets the predetermined level, the photocell will deactivate the light source; conversely, when the certain amount is less than and/or meets the predetermined level, the photocell will activate the light source.

Photocells often have resistances that vary greatly depending on the level of ambient light. For example, a photocell can have a resistance of 70 KΩ during a moonlit night, while having a resistance of just 300Ω during an overcast day. The variance in resistance is an important feature of a photocell, because it controls whether or not the light source is on or off as a result of changes in ambient light, and the consequent changes in resistance.

Photocells are commonly used because they are small and inexpensive, and because they do not use a great deal of power. Photocells can, however, short-circuit or become open circuits. A photocell circuit that has become an open circuit will have many of the characteristics of a normally operating photocell in a dark environment; accordingly, detecting faults in the photocell circuit can be difficult.

Regular testing of photocells is important due to the placement of light sources containing photocells in exterior environments, such as streets, airports, and remote locations. However, in order to accurately test the functionality of a photocell, the photocell must be surrounded by a dark environment. This requires the testing to be performed in the middle of the night, or in a simulated night environment. Moreover, in certain industrial or commercial settings the photocell is disposed at a location that is difficult to reach by a user and/or a height above a ground surface that poses significant injury risks to a user.

Existing methods of testing photocells require the user to create a dark environment surrounding the photocell. Such methods include blacking out the area surrounding the photocell, such as the light source, with dark tape, thereby simulating a dark environment; however, this method is time-consuming, cumbersome, and often leaves sticky residue on the light source housing the photocell. Moreover, because of the location of many photocells, utilizing this method increases the risk of injury to the user.

SUMMARY OF THE INVENTION

The invention provides a photocell cover and method of use that overcomes the hereinafore-mentioned disadvantages of the heretofore-known devices and methods of this general type and that is operable to be used by the user at any time of day and in any level of ambient light. The invention achieves this object by providing a photocell cover to cover a photocell and its housing, blocking any ambient light from reaching the photocell, in order to provide an environment in which the photocell can be tested.

With the foregoing and other objects in view, there is provided, in accordance with the invention, a method of testing a photocell disposed on a lighting fixture, including providing a photocell cover with an enclosed jacket having an internal proximal end and an internal distal end opposite the internal proximal end, that defines a jacket cavity spanning from the internal proximal end to the internal distal end, and defines a distal jacket opening disposed at a distal end of the jacket, the distal jacket opening spatially coupled to the jacket cavity; and inserting a housing of the photocell disposed on a lighting fixture through the distal jacket opening and within the jacket cavity to generate a false-positive light activation reading, wherein the photocell has a non-low-level ambient light reading before insertion.

In one embodiment, the jacket is enclosed along a longitudinal length spanning from the internal proximal end to the internal distal end of the jacket.

In another embodiment, the jacket includes an elastic band disposed at the distal end of the jacket, and the method of testing the photocell further includes elastically deforming the elastic band of the jacket, and frictionally retaining the jacket to the housing of the photocell at least partially through the elastic band.

In a further embodiment, the method of testing a photocell includes the step of disposing the distal end of the jacket on a surface of the lighting fixture.

In one embodiment, the jacket includes an attachment point disposed at the proximal end of the jacket, and the method of testing the photocell includes the step of attaching an elongated arm member to the attachment point; extending the elongated arm member from a substantially ground-level position to a position defined by the housing of the photocell disposed on the light fixture; and covering the housing of the photocell disposed on the light fixture with the jacket.

In another embodiment, the attachment point is a loop.

In a further embodiment, the elongated arm member is a cord.

In one embodiment, the method of testing the photocell further includes the step of detaching the distal end of the jacket from the photocell disposed on a lighting fixture.

In another embodiment, the method of testing the photocell includes the step of disengaging the elastic band disposed at the distal end of the jacket from the photocell disposed on a lighting fixture.

Although the invention is illustrated and described herein as embodied in a photocell cover and method of use, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the photocell cover with an enclosed jacket spanning from the internal proximal end to the internal distal end of the jacket.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient photocell cover and method of use. Embodiments of the invention provide the user with the ability to effectively test photocells at any time of day and in any level of ambient light by providing an apparatus that covers the light source housing the photocell, blocking any ambient light from reaching the photocell, in order to provide an environment in which the photocell can be tested. In addition, embodiments of the invention provide the user with the ability to effectively test photocells without the need to elevate the user to the position directly over the photocell.

Figure 1:
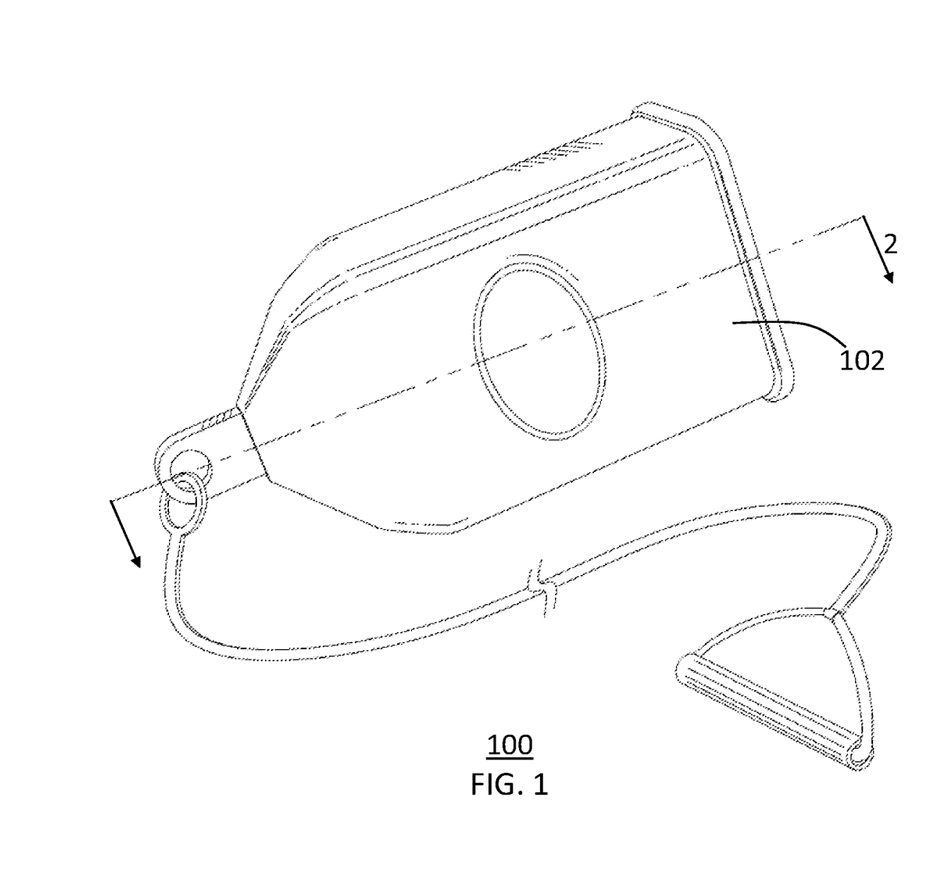
FIG. 1 is a perspective view of a photocell cover in accordance with one embodiment of the present invention.
Figure 2:
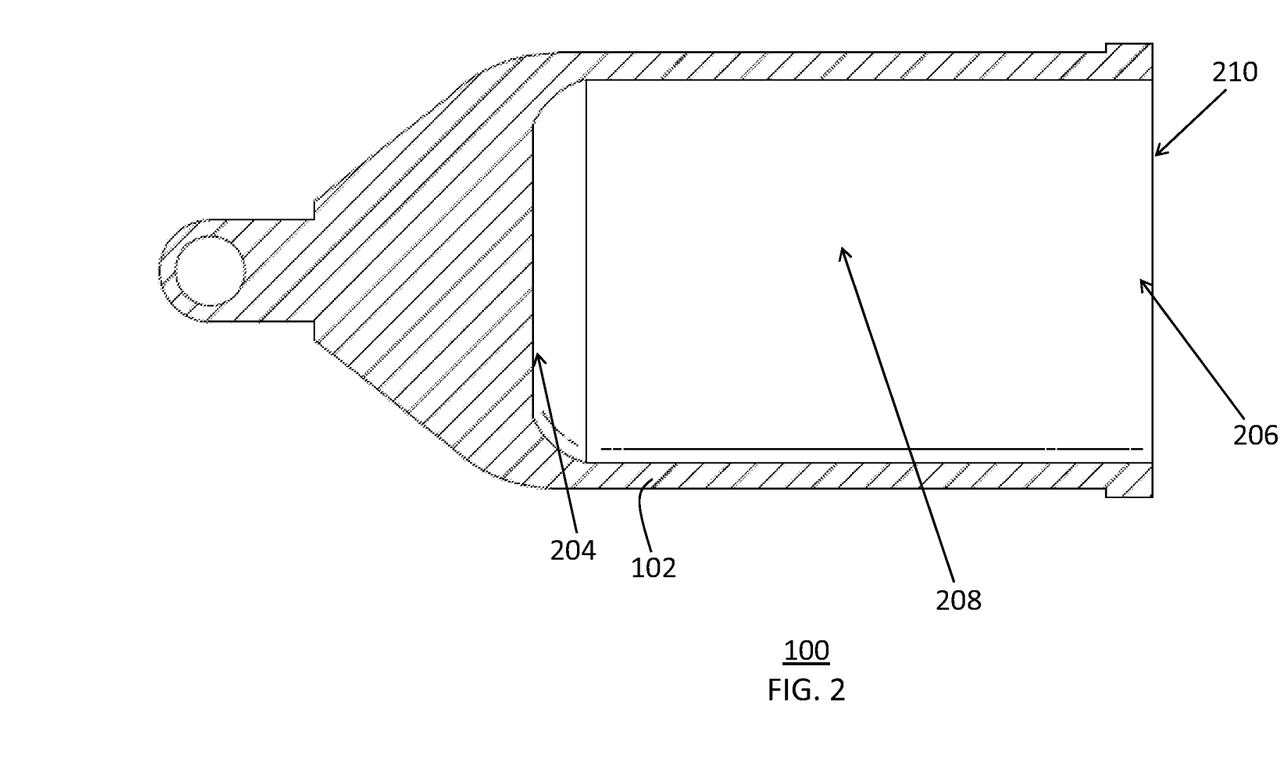
FIG. 2 is a fragmentary cross-sectional view of the cover of FIG. 1 along section line 2-2.
Figure 3:
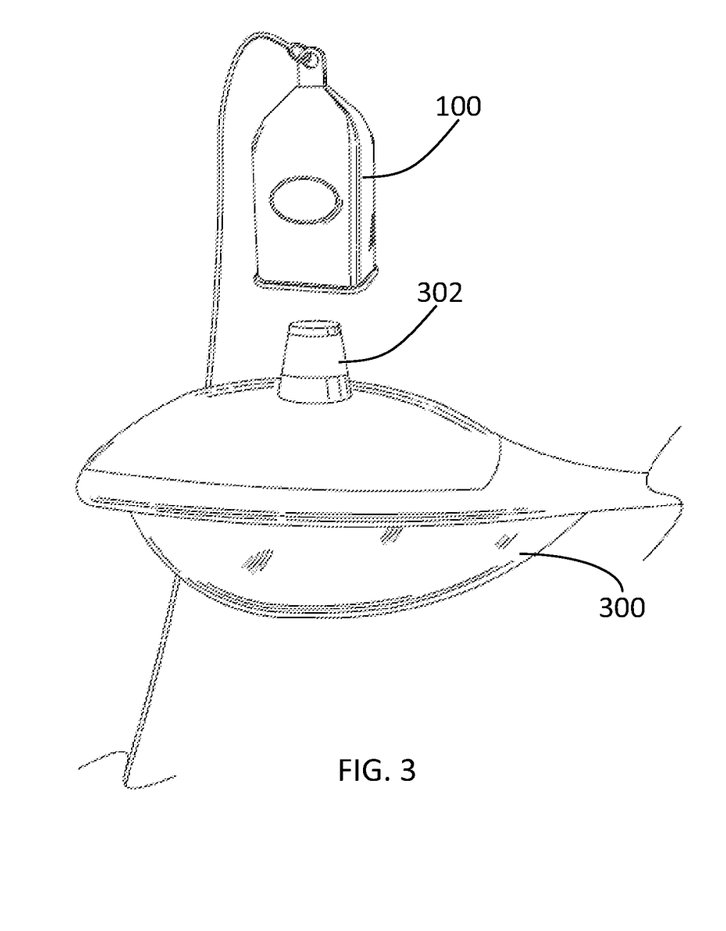
FIG. 3 is a perspective view depicting the use of the photocell cover of FIG. 1 to cover an exemplary photocell in accordance with the present invention.
Figure 4:
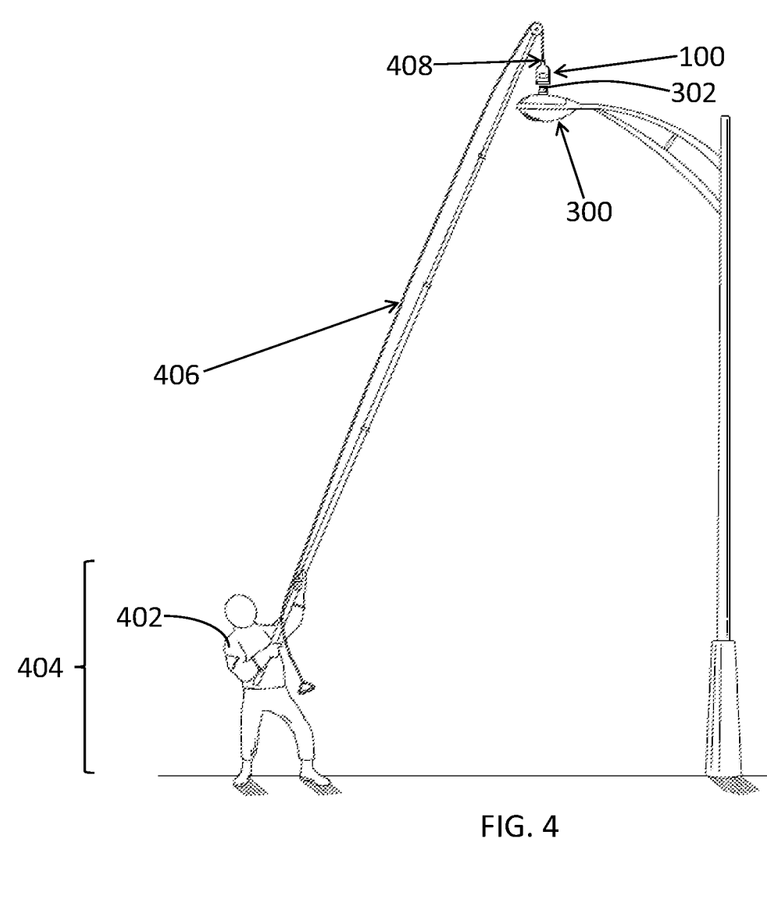
FIG. 4 is a perspective view depicting the use of the photocell cover of FIG. 1 by a user at a substantially ground-level position in accordance with the present invention.
Figure 5:
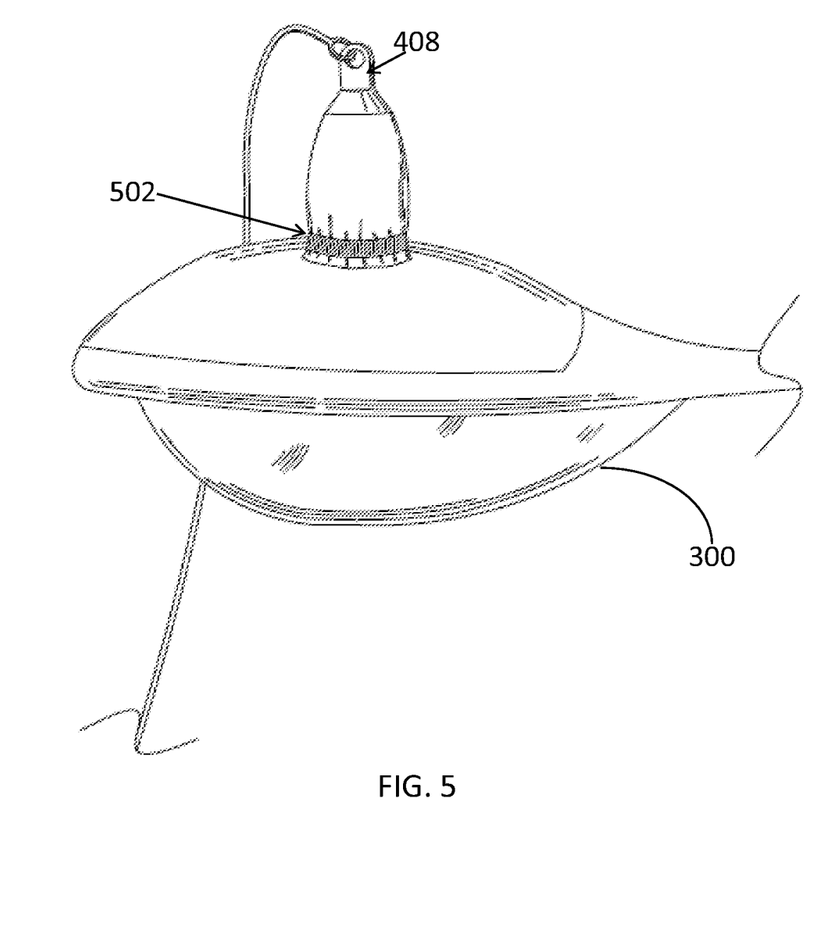
FIG. 5 is a perspective view of a photocell cover having an elastic portion in accordance with an embodiment of the present invention.
Figure 6:
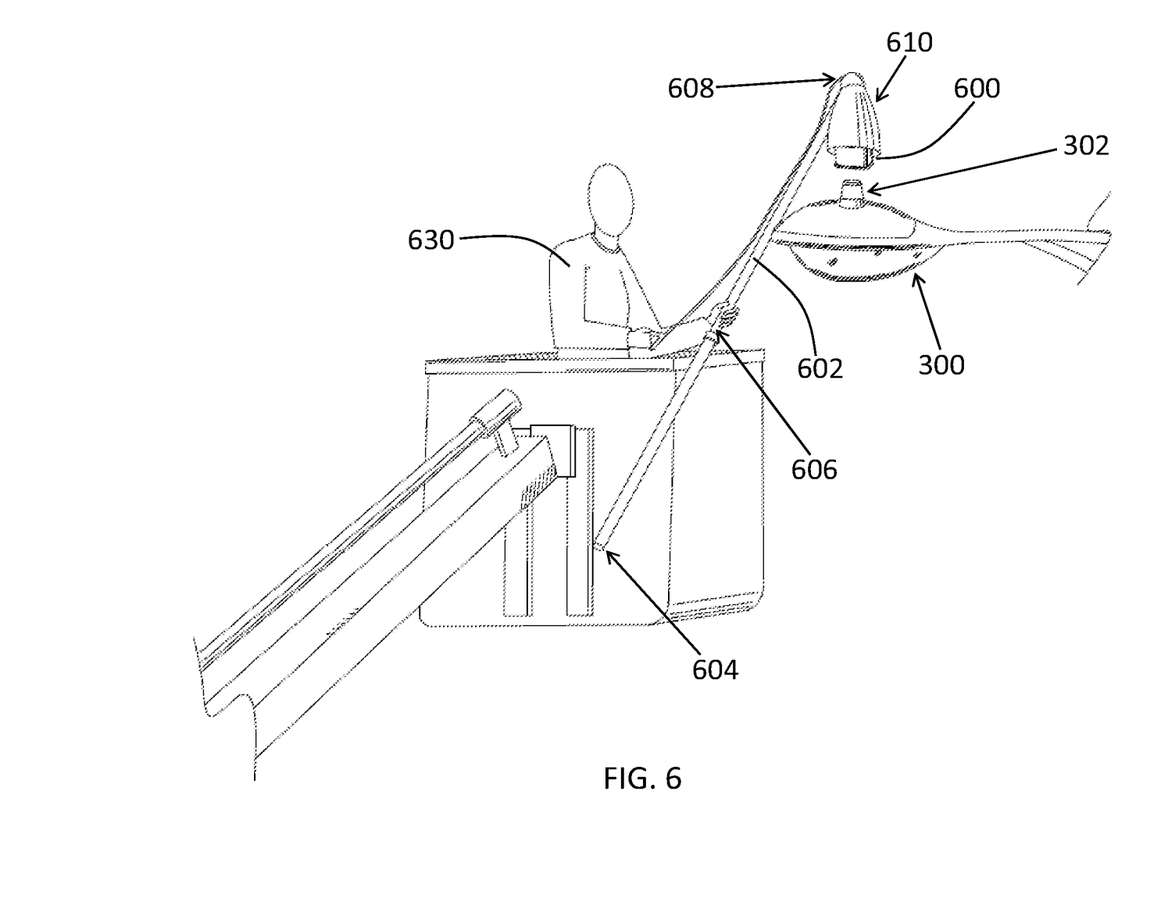
FIG. 6 is a perspective view depicting the use of the photocell cover of FIG. 1 by a user at an elevated position, with the photocell cover disposed above the photocell, in accordance with the present invention.

Referring now to FIGS. 1-2, one embodiment of the present invention is shown in a perspective and cross-sectional view, respectively. FIGS. 1-2 show several advantageous features of the present invention, but, as will be described below, the invention can be provided in several shapes, sizes, combinations of features and components, and varying numbers and functions of the components. The first example of a photocell cover 100, as shown in FIGS. 1-2, includes a jacket 102 having an internal proximal end 204 and an internal distal end 206 opposite the internal proximal end 204. In one embodiment, the jacket 102 of the photocell cover 100 defines a jacket cavity 208 that spans from the internal proximal end 204 to the internal distal end 206 of the jacket 102. In one embodiment, the jacket 102 of the photocell cover 100 defines a distal jacket opening 210 that is disposed at the internal distal end 206 of the jacket 102, with the distal jacket opening 210 being spatially coupled to the jacket cavity 208.

In one embodiment, the jacket 102 of the photocell cover 100 is enclosed. The term "enclosed" is defined herein in its broadest possible sense as substantially surrounding a longitudinal length of the jacket cavity 208.

Figure 8:
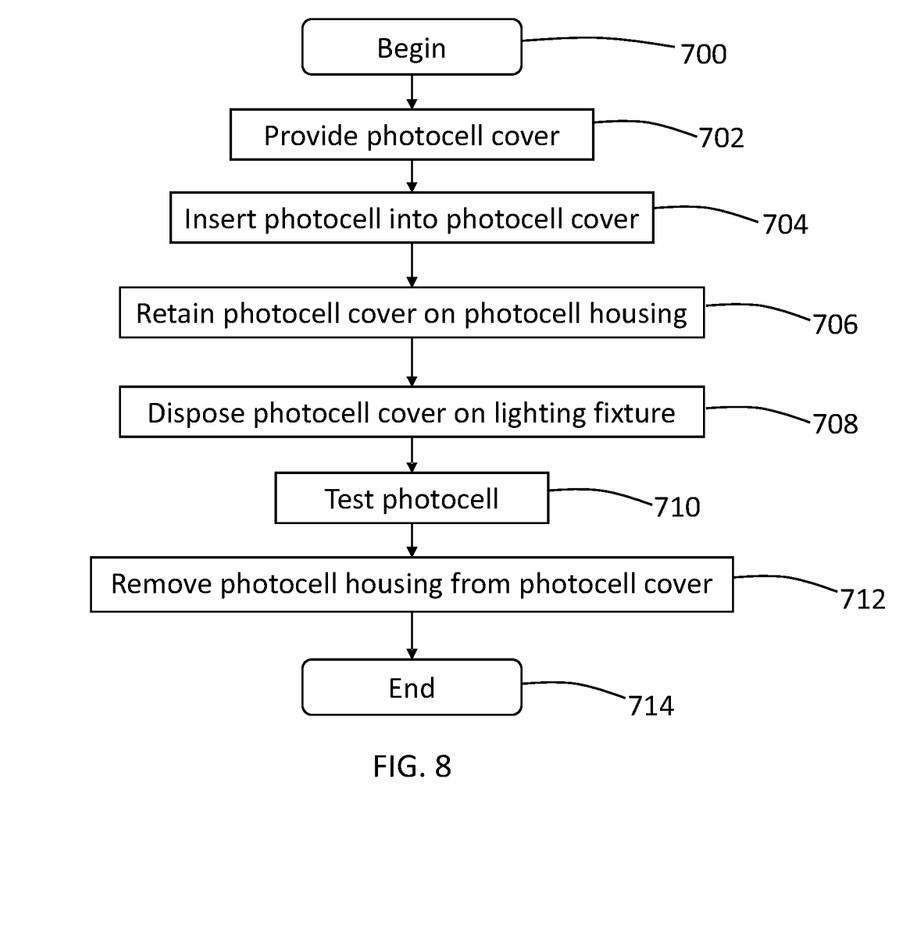
FIG. 8 is a process flow diagram depicting an exemplary method of using a photocell cover in accordance with the present invention.
Figure 9:
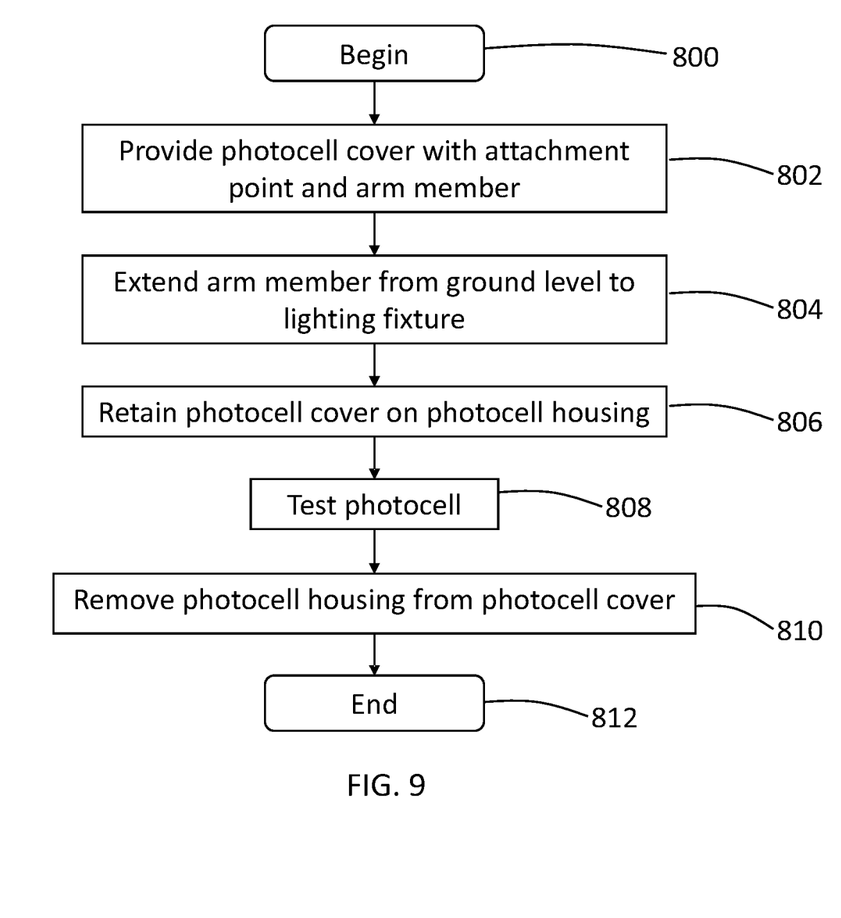
FIG. 9 is process flow diagram depicting an exemplary method of using a photocell cover in accordance with the present invention.
Figure 10:
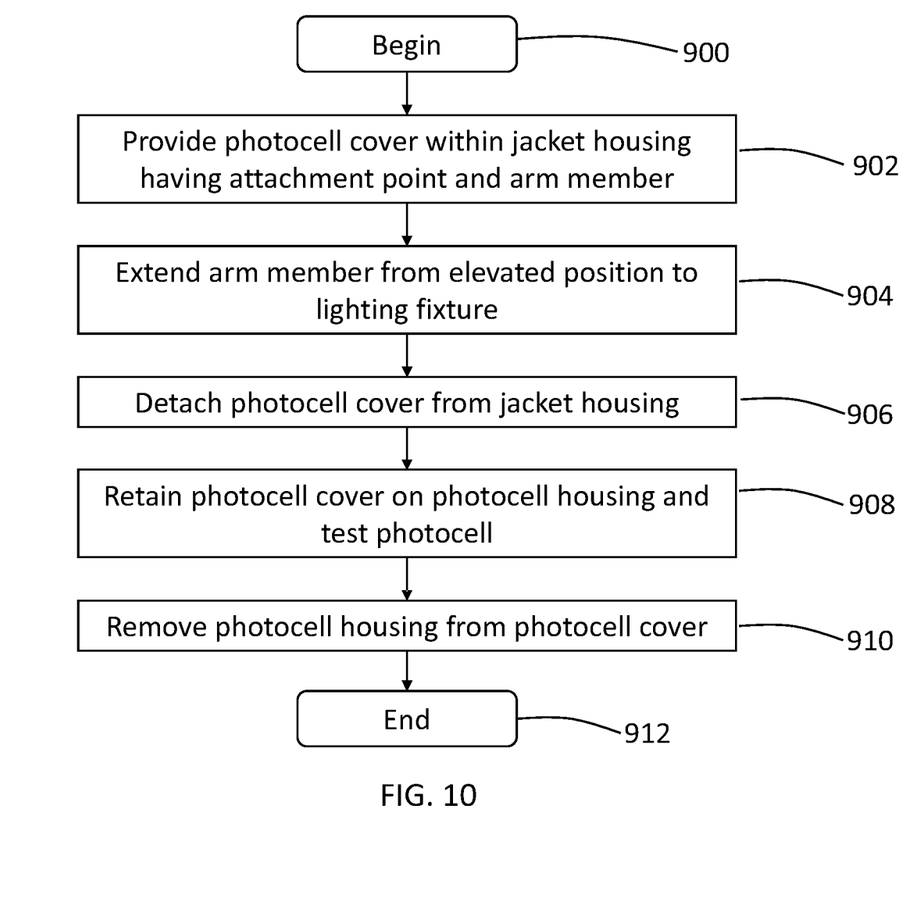
FIG. 10 is a process flow diagram depicting an exemplary method of using a photocell cover in accordance with the present invention.

With reference to FIGS. 1-6, in conjunction with the process flow diagrams of FIGS. 8-10, there is provided a method of using a photocell cover, such as the photocell cover 100. The method is not limited to use with the particular photocell cover structure depicted in FIG. 1, but may be used with other photocell covers as well. Although FIGS. 8-10 show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 8-10 for the sake of brevity. In some embodiments, some or all of the process steps included in FIGS. 8-10 can be combined into a single process.

In one embodiment, a method of testing a photocell begins at step 700 and moves directly to step 702, where a photocell cover 100, which may be referred to herein as the cover 100, is provided. In one embodiment, as mentioned above, the photocell cover 100 may, but does not necessarily, include the jacket 102 having an internal proximal end 204 and an internal distal end 206 opposite the internal proximal end 204, defining a jacket cavity 208 that spans from the internal proximal end 204 to the internal distal end 206, and defines a distal jacket opening 210 that is disposed at the internal distal end 206 of the jacket 102, with the distal jacket opening 210 being spatially coupled to the jacket cavity 208. In one embodiment, the internal distal end 206 of the jacket 102 may include a suction member. In one embodiment, the jacket 102 of the photocell cover is enclosed. The term "enclosed" is defined herein in its broadest possible sense as substantially surrounding a longitudinal length of the jacket cavity 208. The jacket 102 may be any material to suitable to withstand re-occurring use by the user and should be preferably, but not necessarily, waterproof, e.g., a natural rubber, a nitrile rubber, silicone rubber, acrylic, nylon, etc.

In one embodiment, the method moves from step 702 to step 704, wherein a housing of a photocell 302, disposed on a lighting fixture 300, may be inserted through the distal jacket opening 210 and within the jacket cavity 208 to generate a false-positive light activation reading, wherein the housing of the photocell 302 has a non-low-level ambient light reading before insertion. The term "non-low-level ambient light reading" is defined herein in its broadest possible sense as a level that is similar to that of a daytime level of ambient light, including that of an overcast day. In one embodiment, the non-low-level ambient light reading corresponds with a resistance of 300Ω during an overcast day.

In one embodiment, the method proceeds to step 706, which includes elastically deforming an elastic band 502 of the jacket 102, and fictionally retaining the enclosed jacket 102 to the housing of the photocell 302 at least partially through the elastic band 502 of the jacket 102. In other embodiments, step 706 can occur before or during step 704, and the elastic band 502 of the jacket 102 can be elastically deformed before inserting the housing of a photocell 302 disposed on a lighting fixture 300 through the distal jacket opening 210 and within the jacket cavity 208. In one embodiment, the jacket 102 is frictionally retained to a proximal end of the housing of the photocell 302 that is at least partially through the elastic band 502 of the jacket 102.

In one embodiment, the method moves from step 706 to step 708, wherein the internal distal end 206 of the enclosed jacket 102 is disposed on a surface of the lighting fixture 300.

In one embodiment, the method proceeds to step 710, which includes maintaining the housing of the photocell 302 disposed on a lighting fixture 300 within the jacket cavity 208 to determine whether the photocell generates a false-positive light activation reading that corresponds to a low-level ambient light reading. The term "low-level ambient light reading" is defined herein in its broadest possible sense as a level that is similar to that of a nighttime level of ambient light, including that of a moonlit night. In one embodiment, the low-level ambient light reading corresponds with a resistance of 70 KΩ during a moonlit night. Other exemplary resistances, however, may be provided depending on sensor design considerations and/or lighting applications.

In one embodiment, the method proceeds to step 712, which includes uncoupling the internal distal end 206 of the enclosed jacket 102 from the surface of the lighting fixture 300. In one embodiment, the elastic band 502 of the enclosed jacket 102 is disengaged from the housing of the photocell 302 disposed on the lighting fixture 300 such that the housing of the photocell 302 disposed on the lighting fixture 300 is removed from within the jacket cavity 208 and through the distal jacket opening 210. The method may then terminate at step 714.

As specifically shown in FIG. 9, another method of testing a photocell is depicted. The process begins at step 800 and moves directly to step 802, wherein a photocell cover 100 is provided which includes an attachment member 408 for attaching an elongated arm member 406 to the photocell cover 100. In one embodiment, as mentioned above, the photocell cover 100 may, but does not necessarily, include the jacket 102 having an internal proximal end 204 and an internal distal end 206 opposite the internal proximal end 204, defining a jacket cavity 208 that spans from the internal proximal end 204 to the internal distal end 206, and defines a distal jacket opening 210 that is disposed at the internal distal end 206 of the jacket 102, with the distal jacket opening 210 being spatially coupled to the jacket cavity 208. In one embodiment, a user 402 can test a photocell from a substantially ground level position 404. The term "substantially ground level position" is defined herein in its broadest possible sense as a position at which the user 402 can extend the elongated arm member 406 to a position defined by the housing of the photocell 302 disposed on the lighting fixture 300. The term "attachment member" is defined herein in its broadest possible sense as a structural point of the photocell cover 100, e.g., a loop, configured to allow the user to connect, for example, an elongated arm member 406 to the photocell cover 100. The term "elongated arm member" 406 is defined herein in its broadest possible sense and may be a nylon or polymeric cord, wire, or other flexible structure that the user may use to couple with the attachment member 408 to effectuate a quick and effective placement of the photocell cover 100 in a position where it substantially encloses the photocell to generate a false-positive light activation reading.

In one embodiment, the method proceeds from step 802 to step 804, in which the elongated arm member 406 extends from the substantially ground-level position 404 to the position defined by the housing of the photocell 302 disposed on the lighting fixture 300. In other embodiments, the elongated arm member 406 may only span approximately 2-3 feet in total length or may span another length sufficient to enable the user to apply a tensile force on the jacket 102 without having to unsafely reach over the lighting fixture 300 or place the user in an unsafe position relative to the lighting fixture 300.

In one embodiment, the method proceeds from step 804 to step 806, where the housing of the photocell 302 disposed on the lighting fixture 300 may be inserted through the distal jacket opening 210 and within the jacket cavity 208 to generate a false-positive light activation reading, wherein the housing of the photocell 302 has a non-low-level ambient light reading before insertion.

In one embodiment, the jacket 102 includes an elastic band 502 that is elastically deformed and frictionally retained to the housing of a photocell 302 at least partially through the elastic band 502 of the jacket 102. In other embodiments, the elastic band 502 of the jacket 102 can be elastically deformed before inserting the housing of a photocell 302 disposed on a lighting fixture 300 through the distal jacket opening 210 and within the jacket cavity 208. In one embodiment, the jacket 102 is frictionally retained to a proximal end of the housing of the photocell 302 that is at least partially through the elastic band 502 of the jacket 102. In one embodiment, the jacket housing cavity 612 is shaped and sized to conform to a portion of the jacket 102 of the photocell cover 100. For example, both the jacket housing cavity 612 and the jacket 102 have portions which are rectangular in shape and have dimensions of 2"×2"×2" (length×width×height), such that the jacket housing 610 is configured to frictionally retain the jacket 102 thereto. The overall and relative dimensions may vary depending on the property materials, e.g., elasticity, for the jacket housing 610 and the jacket 102.

In one embodiment, the method includes step 808, which includes disposing the internal distal end 206 of the jacket 102 on a surface of a lighting fixture 300, and maintaining the housing of the photocell 302 disposed on a lighting fixture 300 within the jacket cavity 208 to determine whether the photocell generates a false-positive light activation reading that corresponds to a low-level ambient light reading. In one embodiment, the method proceeds from step 808 to step 810, which includes uncoupling the internal distal end 206 of the jacket 102 from the surface of the lighting fixture 300. In one embodiment, the elastic band 502 of the enclosed jacket 102 is disengaged from the housing of the photocell 302 disposed on the lighting fixture 300 such that the housing of the photocell 302 disposed on the lighting fixture 300 is removed from within the jacket cavity 208 and through the distal jacket opening 210. The method may then terminate at step 812.

In one embodiment, another exemplary method of testing a photocell begins at step 900 and moves directly to step 902, where a photocell cover 100 is provided. In one embodiment, as mentioned above, the photocell cover 100 may, but does not necessarily, include the jacket 102 having an internal proximal end 204 and an internal distal end 206 opposite the internal proximal end 204 defining a jacket cavity 208 that spans from the internal proximal end 204 to the internal distal end 206 and defines a distal jacket opening 210 that is disposed at the internal distal end 206 of the jacket 102 with the distal jacket opening 210 being spatially coupled to the jacket cavity 208.

In one embodiment, a pole member 602 is employed by the user to couple the cover 100 to the photocell 302. The pole member 602 may have a proximal end 604, a handle portion 606, where a user can grasp, and a distal end 608 with a jacket housing 610 disposed thereon. The jacket housing 610 may define a jacket housing cavity 612. Before inserting the housing of the photocell 302 disposed on a lighting fixture 300 through the distal jacket opening 210, the jacket 102 of the photocell cover 100 may be inserted into the jacket housing cavity 612 until it is frictional retained by the jacket housing 610. This frictional retention may be caused by a dimensional disproportion wherein, for example, the diameter of the jacket housing cavity 612 may be less than the length and/or width of the jacket 102 (spanning from outer surface to opposing outer surface). In one embodiment, the pole member 602 includes at least two pole arm members 626, 628 operably configured to telescope to provide a user extended reaching capacity when installing the jacket 102 on the photocell 302. In one embodiment, the pole member 602 may include a threaded portion to attach to the jacket housing 610. In one embodiment, the jacket housing 610 may include a threaded portion to attach to the pole member 602.

The method may then proceed from step 902 to step 904, in which an attachment member 614, which may be formed by the jacket and/or disposed at a proximal end 616 of the jacket 102, is provided. An elongated arm member 618 may be coupled to the attachment member 614 at a proximal end 620 of the elongated arm member 618. A distal end 632 of the elongated arm member 622, opposite the proximal end 620 of the elongated arm member 618, may include a handle portion 624, e.g., a loop. In one embodiment, the elongated arm member 618 may be inserted through the jacket housing cavity 612 and through a slit defined by a sidewall of the jacket housing 610.

In one embodiment, the method proceeds from step 904 to step 906, in which the jacket 102 of the photocell cover 100 is detached from within the jacket housing cavity 612 and held in place by a user 630 by holding the handle 624 of the elongated arm member 618. A housing of a photocell 302 disposed on a lighting fixture 300 may be inserted through the distal jacket opening 210 and within the jacket cavity 208 to generate a false-positive light activation reading, wherein the housing of the photocell 302 has a non-low-level ambient light reading before insertion.

In one embodiment, the jacket 102 includes an elastic band 502 that is elastically deformed and frictionally retained to the housing of a photocell 302 at least partially through the elastic band 502 of the jacket 102. In other embodiments, the elastic band 502 of the jacket 102 can be elastically deformed before inserting the housing of a photocell 302 disposed on a lighting fixture 300 through the distal jacket opening 210 and within the jacket cavity 208. In one embodiment, the jacket 102 is frictionally retained to a proximal end of the housing of the photocell 302 that is at least partially through the elastic band 502 of the jacket 102.

In one embodiment, the method proceeds to step 908, which includes disposing the internal distal end 206 of the jacket 102 on an outer surface of a photocell 302 disposed on a lighting fixture 300, and maintaining the housing of the photocell 302 disposed on a lighting fixture 300 within the jacket cavity 208 to determine whether the photocell 302 generates a false-positive light activation reading that corresponds to a low-level ambient light reading. The method may then proceed from step 908 to step 910, which includes the user uncouples the internal distal end 206 of the jacket 102 from the surface of the photocell 302. In one embodiment, the elastic band 502 of the enclosed jacket 102 is disengaged from the housing of the photocell 302 disposed on the lighting fixture 300 such that the housing of the photocell 302 disposed on the lighting fixture 300 is removed from within the jacket cavity 208 and through the distal jacket opening 210. The method may then terminate at step 912.

Figure 7:
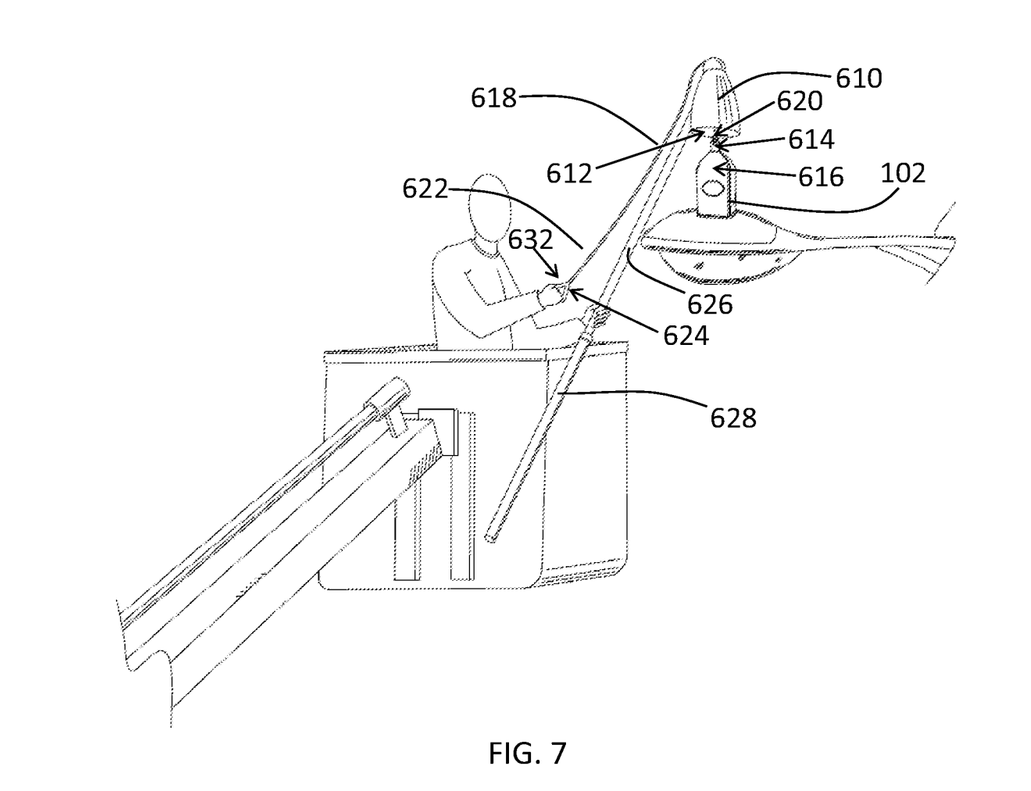
FIG. 7 is a perspective view depicting the use of the photocell cover of FIG. 1 to cover a photocell by a user at an elevated position, with the photocell cover coupled to the photocell, in accordance with the present invention.

In one embodiment, a user 630 can perform any of the preceding steps from a substantially elevated position. The term "substantially elevated position" is defined herein in its broadest possible sense as an above-ground position, including a heightened position in which the user 630 is lifted to a position adjacent to a lighting fixture 300, as depicted, for example, in FIGS. 6-7.

A photocell cover and method of use has been disclosed that provides the user with the ability to test a photocell at any time of day and in any level of ambient light. The invention achieves this object by providing a photocell cover to cover a photocell and its housing, blocking any ambient light from reaching the photocell, in order to provide an environment in which the photocell can be tested.

What is claimed is:

1. A method of testing a photocell disposed on a lighting fixture comprising:
   providing a photocell cover with a jacket:
      having an internal proximal end;
      an internal distal end, opposite the internal proximal end;
      defining a substantially enclosed jacket cavity spanning from the internal proximal end to the internal distal end; and
      defining a distal jacket opening disposed at a distal end of the jacket, the distal jacket opening spatially coupled to the jacket cavity; and
   inserting a housing of the photocell disposed on a lighting fixture through the distal jacket opening and within the jacket cavity to block any ambient light from reaching the photocell within the jacket cavity and to generate a false-positive light activation reading, wherein the photocell has a non-low-level ambient light reading before insertion.

2. The method according to claim 1, wherein the jacket includes an elastic band disposed at the distal end of the jacket, further comprising the step of:
   elastically deforming the elastic band of the jacket; and
   frictionally retaining the jacket to the housing of the photocell at least partially through the elastic band.

3. The method according to claim 2, further comprising the step of:
   frictionally retaining the jacket to a proximal end of the housing of the photocell at least partially through the elastic band.

4. The method according to claim 1, further comprising the step of:
   disposing the distal end of the jacket on a surface of the lighting fixture.

5. The method according to claim 1, wherein the jacket includes an attachment member disposed at a proximal end of the jacket, further comprising the step of:
   providing an elongated arm member and attaching the elongated arm member to the attachment member;
   extending the elongated arm member from a substantially ground-level position to a position defined by the housing of the photocell disposed on the light fixture; and
   covering the housing of the photocell disposed on the light fixture with the jacket.

6. The method according to claim 5, wherein:
   the attachment member is a loop.

7. The method according to claim 5, wherein,
   the elongated arm member is a flexible cord.

8. The method according to claim 1, further comprising the step of:
   uncoupling the distal end of the jacket from the photocell disposed on a lighting fixture.

9. The method according to claim 8, further comprising the step of:
   elastically deforming an elastic band disposed at the distal end of the jacket from the photocell disposed on a lighting fixture.

10. The method according to claim 1, further comprising the steps of:
    providing a pole member with a proximal end having a handle and a distal end having a jacket housing disposed thereon, the distal end opposite the proximal end, the jacket housing defining a jacket housing cavity; and
    before inserting the housing of the photocell disposed on a lighting fixture through the distal jacket opening, inserting the jacket of the photocell cover into the jacket housing cavity until it is frictional retained by the jacket housing.

11. The method according to claim 10, wherein:
    the pole member includes at least two pole arm members operably configured to telescope.

12. The method according to claim 10, wherein:
    the jacket housing cavity is shaped and sized to conform to a portion of the jacket of the photocell cover.

13. The method according to claim 10, further comprising the steps of:
    providing an attachment member disposed at a proximal end of the jacket;
    providing an elongated arm member with a proximal end and a distal end, opposing the proximal end;
    attaching the proximal end of the elongated arm member to the attachment member; and
    inserting the elongated arm member through the jacket housing cavity and a slit defined by a sidewall of the jacket housing.

14. The method according to claim 13, wherein:
    the elongated arm member includes a handle disposed at the distal end of the elongated arm member.

* * * * *